(12) United States Patent
Finke et al.

(10) Patent No.: US 11,105,377 B2
(45) Date of Patent: Aug. 31, 2021

(54) RETAINING RING ASSEMBLIES

(71) Applicant: Hamilton Sundstrand Corporation, Charlotte, NC (US)

(72) Inventors: Aaron M. Finke, Janesville, WI (US); Stephen Michael Bortoli, Roscoe, IL (US); Mark J. Franklin, Janesville, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 244 days.

(21) Appl. No.: 16/247,184

(22) Filed: Jan. 14, 2019

(65) Prior Publication Data
US 2020/0224727 A1   Jul. 16, 2020

(51) Int. Cl.
*F16B 17/00* (2006.01)
*F16D 1/108* (2006.01)
*F16D 1/10* (2006.01)

(52) U.S. Cl.
CPC ........ *F16D 1/108* (2013.01); *F16D 2001/102* (2013.01)

(58) Field of Classification Search
CPC .... F16D 1/00; F16D 1/108; F16B 2/00; F16B 15/00; F16B 17/00; B25G 3/28
USPC ......... 403/315, 316, 318, 345, 359.1, 359.5, 403/365–369
See application file for complete search history.

(56) References Cited

U.S. PATENT DOCUMENTS

| | | | | |
|---|---|---|---|---|
| 1,978,186 A | * | 10/1934 | Buchanan | F16C 35/063 384/539 |
| 2,959,944 A | * | 11/1960 | Brownstein | F16D 3/56 464/65.1 |
| 3,997,989 A | | 12/1976 | Stepe | |
| 5,403,020 A | | 4/1995 | McOnie | |
| 5,615,893 A | | 4/1997 | Reagan | |
| 9,695,688 B2 | * | 7/2017 | Wachsmann | E21C 35/197 |
| 2017/0343046 A1 | | 11/2017 | Park et al. | |

FOREIGN PATENT DOCUMENTS

| | | |
|---|---|---|
| DE | 102010018155 A1 | 11/2010 |
| DE | 102011121536 A1 | 6/2013 |
| EP | 0422372 A2 | 4/1991 |
| JP | H02113016 A | 9/1990 |
| WO | 2018/222682 A1 | 12/2018 |

OTHER PUBLICATIONS

Extended European search report issued in corresponding EP application No. 19212834.6, dated May 27, 2020.

* cited by examiner

*Primary Examiner* — Hoan H Tran
(74) *Attorney, Agent, or Firm* — Locke Lord LLP; Scott D. Wofsy; Daniel J. Fiorello

(57) ABSTRACT

A retaining ring configured to retain a shaft to a sleeve to fix the shaft rotationally and axially to the sleeve can include a first portion configured to install around the shaft and within the sleeve. The first portion can include one or more first curved sections and at least one first portion flat. The retaining ring can include a second portion configured to install around the shaft and moveable relative to the first portion, the second portion comprising one or more second curved sections and at least one second portion flat. The first portion flat can be defined between a plurality of the first curved sections, and wherein the second portion flat can be defined between a plurality of the second curved sections, for example.

17 Claims, 5 Drawing Sheets

RETAINING RING ASSEMBLIES

BACKGROUND

1. Field

This disclosure relates to retainers, more specifically to retaining ring assemblies.

2. Description of Related Art

In certain fields of art, it is necessary to be able to loosely install a sleeve onto a shaft and to mechanically tie the two parts together to allow them to rotate as one. It may also be necessary to prevent axial movement of the sleeve after assembly onto the shaft. In certain embodiments, it can be necessary to locate oil lubrication holes in both the shaft and sleeve in the same plane.

Such conventional methods and systems have generally been considered satisfactory for their intended purpose. However, there is still a need in the art for improved retainer assemblies. The present disclosure provides a solution for this need.

SUMMARY

A retaining ring configured to retain a shaft to a sleeve to fix the shaft rotationally and axially to the sleeve can include a first portion configured to install around the shaft and within the sleeve. The first portion can include one or more first curved sections and at least one first portion flat. The retaining ring can include a second portion configured to install around the shaft and moveable relative to the first portion, the second portion comprising one or more second curved sections and at least one second portion flat. The first portion flat can be defined between a plurality of the first curved sections, and wherein the second portion flat can be defined between a plurality of the second curved sections, for example.

The first portion and the second portion can be identical halves of the retaining ring. The first portion and the second portion may not be connected together such that the first portion and the second portion are free from each other.

The first portion and the second portion can be made of metal (e.g., steel). Any other suitable material is contemplated herein.

In certain embodiments, an edge of the first portion flat and/or second portion flat can be parallel with an edge of each curved section end. Any suitable location or orientation for the flats is contemplated herein. Any other suitable position of the curved sections and the one or more flats are contemplated herein.

In accordance with at least one aspect of this disclosure, a system can include a shaft having at least one retaining ring slot defined on an outer radius thereof, the retaining ring slot at least including at least one first flat detent, a sleeve comprising a central orifice for receiving the shaft, the sleeve defining at least one inner radius ring interface defining at least one flat section, and a retaining ring retaining the shaft to the sleeve to fix the shaft rotationally and axially to the sleeve. The retaining ring can be any suitable retaining ring, e.g., as disclosed above.

The first portion flat can be disposed flushly in contact with the first detent. The second portion flat can be disposed flushly in contact with a second detent of the retaining ring slot.

In certain embodiments, the retaining ring slot can be symmetric about the shaft. The inner radius ring interface can be symmetric about the central orifice. The sleeve can define a clip slot axially forward of the inner radius ring interface and configured to receive a spring clip.

The system can include a spring clip disposed with the clip slot to axially retain the retaining ring to the sleeve, thereby axially retaining the shaft to the sleeve. In certain embodiments, the shaft and the sleeve form at least a portion of a hydraulic system, wherein a shaft lubricant hole is aligned with a sleeve lubricant hole when the retained together by the retaining ring.

A method for retaining a shaft to a sleeve can include installing a first portion of a retaining ring in at least one retaining ring slot defined on an outer radius of a shaft, the retaining ring slot at least including at least one first portion flat detent, such that at least one first portion flat of the first portion is flush with the at least one first flat detent, and installing a second portion of a retaining ring in at least one of the least one retaining ring slot defined on the outer radius of the shaft, the retaining ring slot at least including at least one second portion flat detent, such that at least one second portion flat of the second portion is flush with the at least one first flat detent.

The method can include inserting the shaft having the first portion and second portion thereon into a central orifice of a sleeve such that the first portion and second portion interface with at least one inner radius ring interface defining at least one flat section such that the first portion and the second portion, and consequently the shaft, cannot rotate relative to the sleeve. In certain embodiments, the method can include installing a spring clip into a clip slot that is axially forward of the inner radius ring interface and configured to receive the spring clip to axially retain the retaining ring to the sleeve, thereby axially retaining the shaft to the sleeve.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
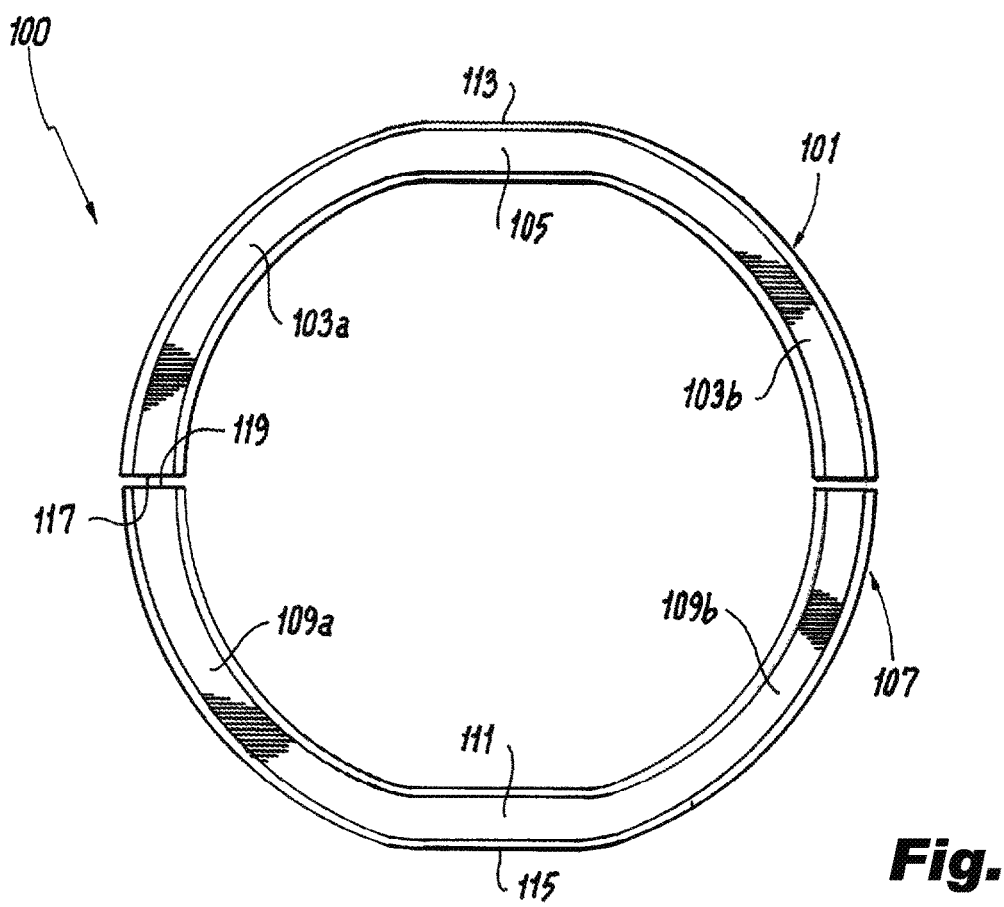
FIG. 1 is a plan view of an embodiment of a retainer ring in accordance with this disclosure.

Reference will now be made to the drawings wherein like reference numerals identify similar structural features or aspects of the subject disclosure. For purposes of explanation and illustration, and not limitation, an illustrative view of an embodiment of a retaining ring in accordance with the disclosure is shown in FIG. 1 and is designated generally by reference character 100. Other embodiments and/or aspects of this disclosure are shown in FIGS. 2-6D.

Figure 2:
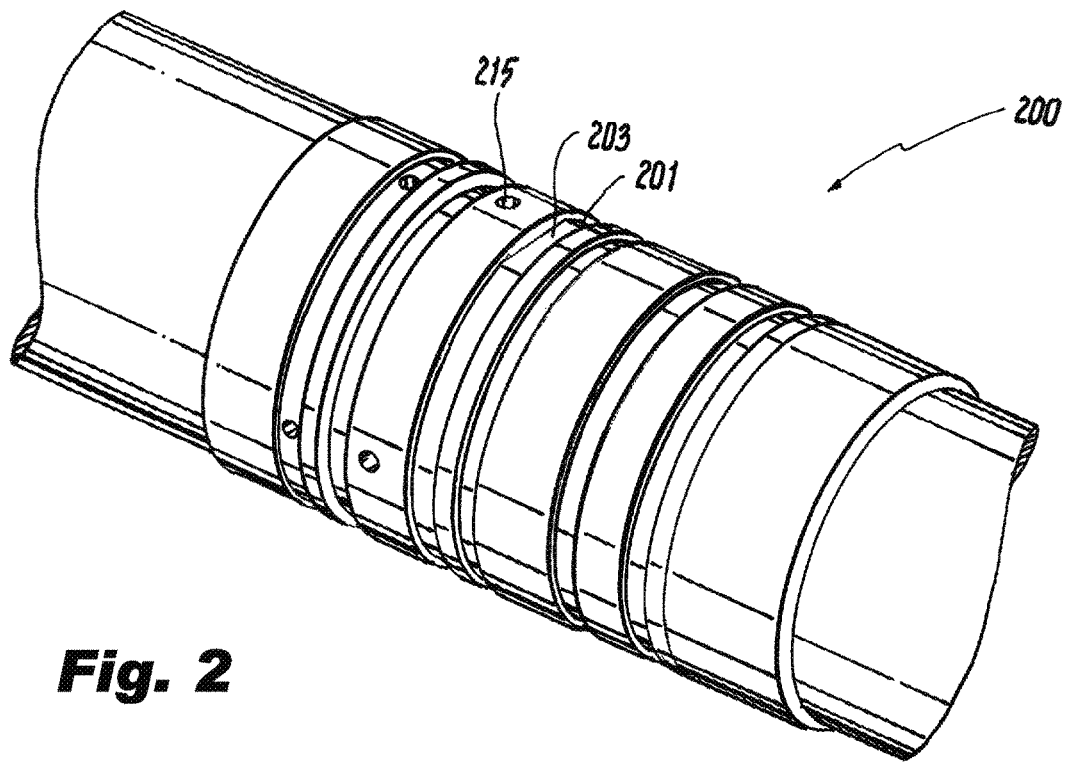
FIG. 2 is a perspective view of an embodiment of a shaft in accordance with this disclosure.
Figure 3:
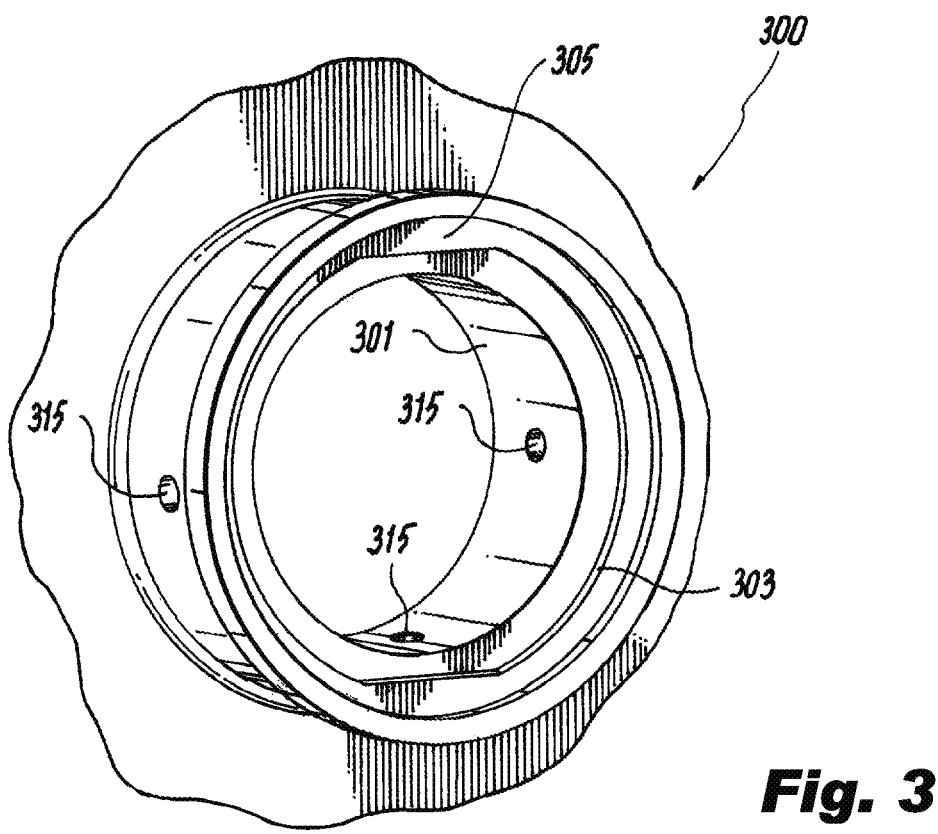
FIG. 3 is a perspective view of an embodiment of a sleeve in accordance with this disclosure.

Referring to FIGS. 1-3, a retaining ring 100 configured to retain a shaft 200 to a sleeve 300 to fix the shaft 200 rotationally and axially to the sleeve 300 can include a first portion 101 configured to install around the shaft 200 and within the sleeve 300. The first portion 101 can include one or more first curved sections 103a, 103b and at least one first portion flat 105. The retaining ring 100 can include a second portion 107 configured to install around the shaft 200 and moveable relative to the first portion 101. The second portion 107 can include one or more second curved sections 109a, 109b and at least one second portion flat 111.

The one or more first portion flat 105 can be defined between a plurality of the first curved sections 103a, 103b as shown. In certain embodiments, the second portion flat 111 can be defined between a plurality of the second curved sections 109a, 109b, for example. Any other suitable positioning for the one or more flats 105, 111 is contemplated herein.

In certain embodiments, the first portion 101 and the second portion 107 can be identical halves of the retaining ring 100. In certain embodiments, the first portion 101 and the second portion 107 may not be connected together as shown, such that the first portion 101 and the second portion 107 are free from each other. In certain embodiments, the first portion 101 and the second portion 107 may be hinged (e.g., at one end of each) to each other or otherwise connected or removably connectable to each other.

The first portion 101 and the second portion 107 can be made of metal (e.g., steel). Any other suitable material is contemplated herein.

In certain embodiments, an edge 113 of the first portion flat 105 and/or an edge 115 of the second portion flat 115 can be parallel with an edge 117, 119 of each curved section end. Any suitable location or orientation for the one or more flats 105, 115 is contemplated herein. Any other suitable position of the curved sections 103a, 103b, 109a, 109b and the one or more flats 105, 115 are contemplated herein.

Figure 4:
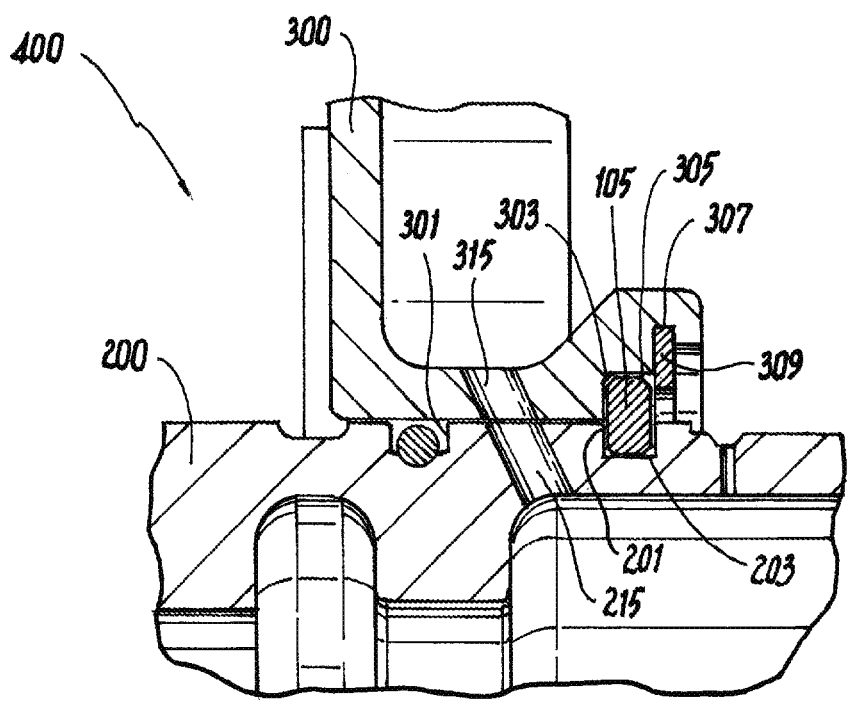
FIG. 4 is a cross-sectional view of an embodiment of a system in accordance with this disclosure; is a cross-sectional view of an embodiment of a system in accordance with this disclosure.
Figure 5:
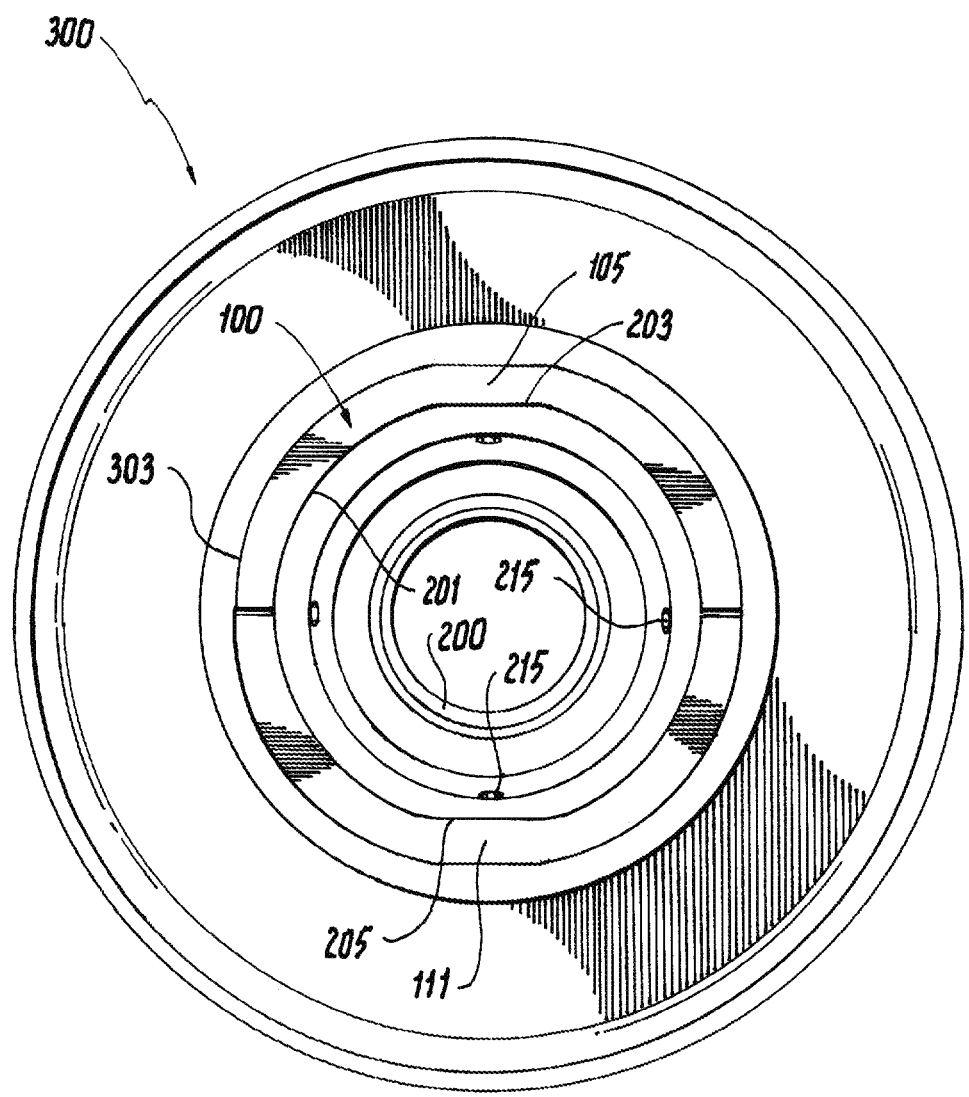
FIG. 5 is a cross-sectional view of the embodiment of FIG. 4.

Referring additionally to FIGS. 4 and 5, a system 400 can include a shaft 200 having at least one retaining ring slot 201 defined on an outer radius thereof. The retaining ring slot 201 at least includes at least one first flat detent 203 (e.g., one for each first flat 105). In certain embodiments, the shaft can include at least one second flat detent 205 (e.g., one for each second flat 111), e.g., on a diametrically opposite side of the shaft 200.

The system can include a sleeve 300 comprising a central orifice 301 for receiving the shaft 200. The sleeve 300 can define at least one inner radius ring interface 303 defining at least one flat section 305. The system 400 can include the retaining ring 100 retaining the shaft 200 to the sleeve 300 to fix the shaft 200 rotationally and axially to the sleeve 300, for example, as shown. The retaining ring 100 can be any suitable retaining ring, e.g., as disclosed above.

The first portion flat 105 can be disposed flushly in contact with the first flat detent 203. The second portion flat 111 can be disposed flushly in contact with the second flat detent 205 of the retaining ring slot 201.

In certain embodiments, the retaining ring slot 201 can be symmetric about the shaft 200 as shown. The inner radius ring interface 303 can be symmetric about the central orifice 301, as shown. The sleeve 300 can define a clip slot 307 axially forward of the inner radius ring interface 303, e.g., as shown, and configured to receive a spring clip 309 (e.g., a c-clip, a spiral lock).

The system 400 can include the spring clip 309 disposed within the clip slot 307 to axially retain the retaining ring 100 to the sleeve 300, thereby axially retaining the shaft 200 to the sleeve 300. In certain embodiments, the shaft 300 and the sleeve 200 form at least a portion of a hydraulic system. As shown, a shaft lubricant hole 215 can be aligned with a sleeve lubricant hole 315 when the retained together by the retaining ring 100.

Figure 6A:
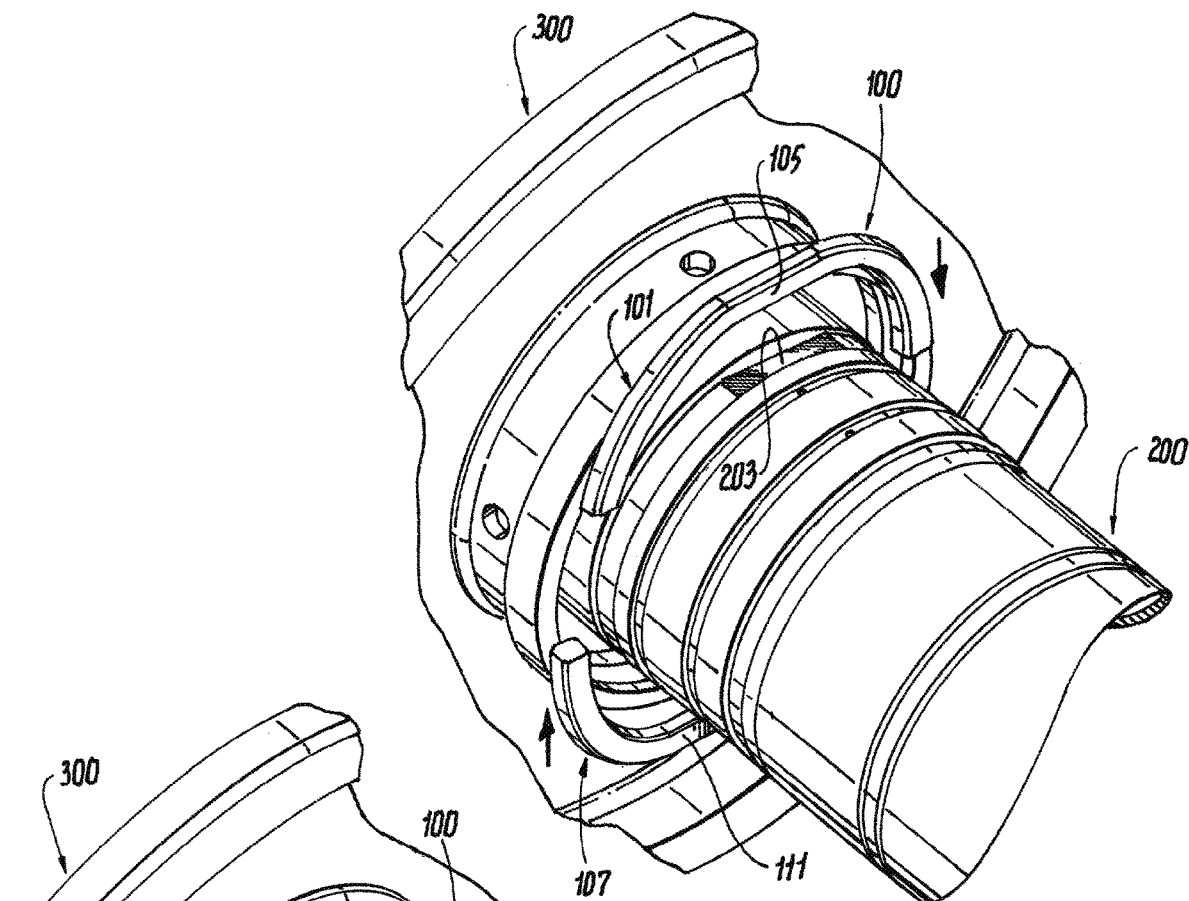
FIGS. 6A, 6B, 6C, and 6D illustrate an embodiment of a method in accordance with this disclosure.
Figure 6B:
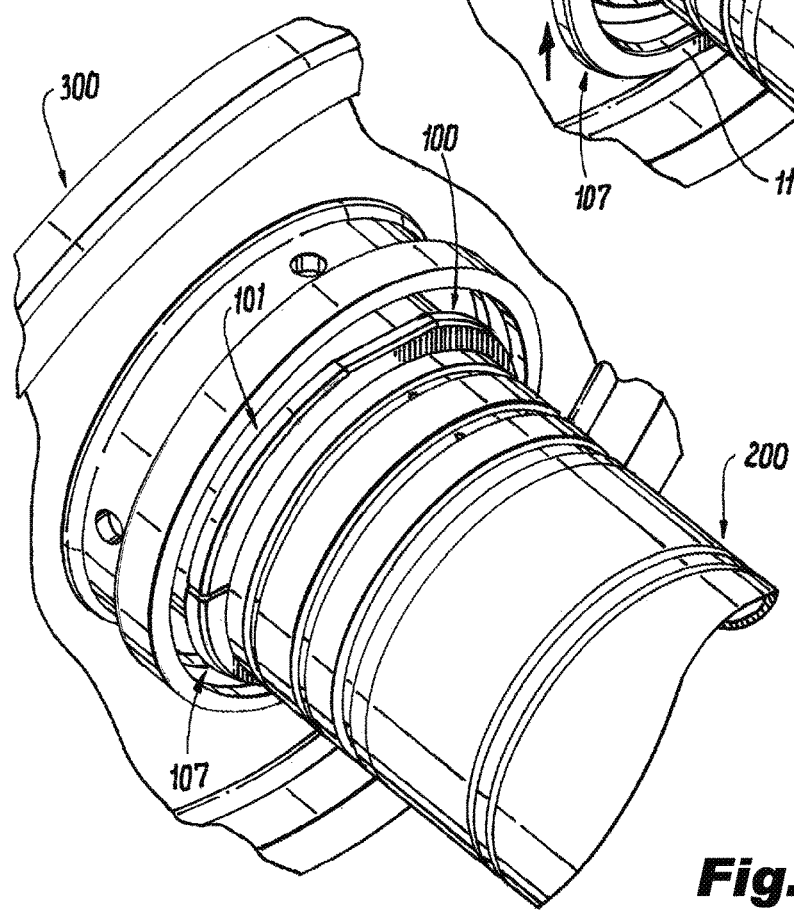

Referring additionally to FIGS. 6A and 6B, a method for retaining a shaft 200 to a sleeve 300 can include installing a first portion 101 of a retaining ring 100 in at least one retaining ring slot 201 defined on an outer radius of a shaft 200. The retaining ring slot can at least include at least one first portion flat detent, such that at least one first portion flat of the first portion is flush with the at least one first flat detent. The method can include installing a second portion 107 of a retaining ring 100 in at least one of the least one retaining ring slot 201 defined on the outer radius of the shaft 200. The retaining ring slot can at least include at least one second portion flat detent, such that at least one second portion flat of the second portion is flush with the at least one first flat detent.

Figure 6C:
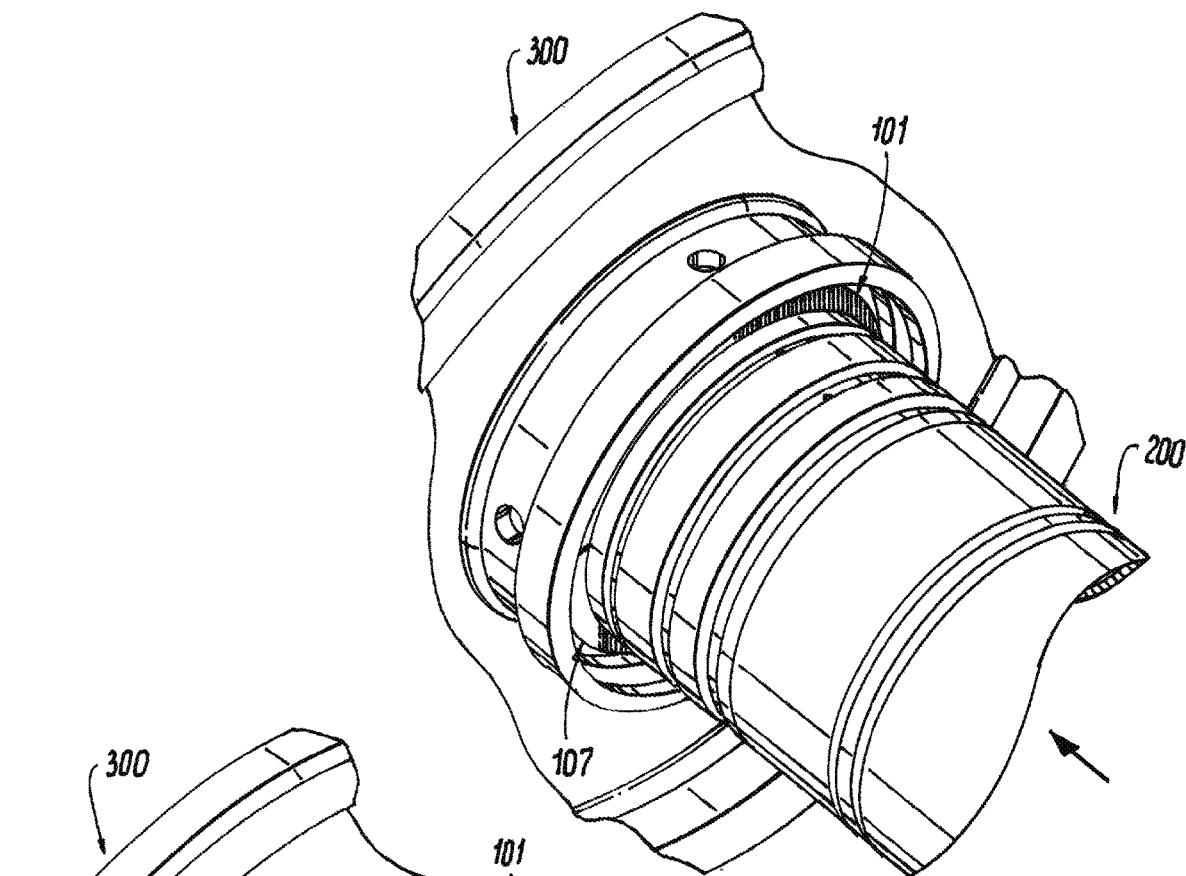
Figure 6D:
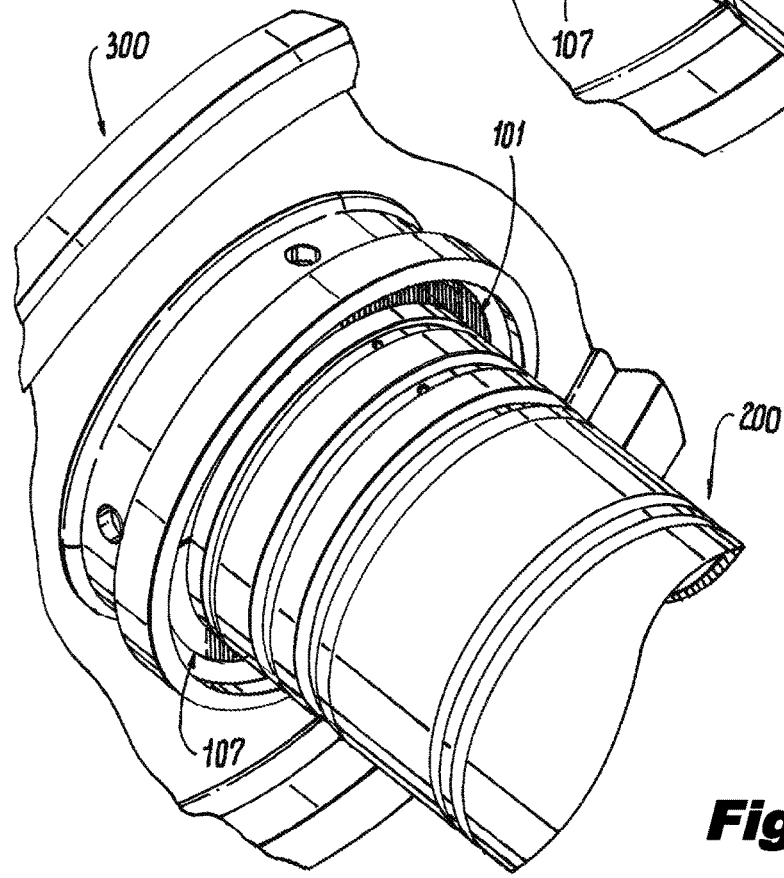

Referring to FIG. 6C, the method can include inserting the shaft 200 having the first portion and second portion thereon into a central orifice 301 of a sleeve 300 such that the first portion and second portion interface with at least one inner radius ring interface defining at least one flat section such that the first portion and the second portion, and consequently the shaft 200, cannot rotate relative to the sleeve 300. Referring to FIG. 6D, in certain embodiments, the method can include installing a spring clip 309 into a clip slot 307 that is axially forward of the inner radius ring interface and configured to receive the spring clip to axially retain the retaining ring to the sleeve, thereby axially retaining the shaft to the sleeve.

Certain embodiments disclosed above include a ring that is split into two halves. Each half can include a flat segment. The flats mate with flats in a shaft and an outer sleeve to provide axial and rotational alignment between the shaft and the sleeve. A separate common retaining ring can be installed to prevent axial motion in the opposite direction after assembly to lock the assembly together. Alignment (relative clocked position) can be controlled as a function of flat location on each of the shaft, sleeve, and ring, and can allow for proper positioning of additional features (e.g., lubrication holes).

Embodiments allow two parts to rotate as one without using more complex/costly features (splines, interference fits). Certain embodiments can only be assembled in one orientation, which allows for easy alignment of additional features such as lubrication holes.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A retaining ring configured to retain a shaft to a sleeve to fix the shaft rotationally and axially to the sleeve, comprising:
    a first portion configured to install around the shaft and within the sleeve, comprising one or more first curved sections and at least one first portion flat, wherein the first portion flat is defined between a plurality of the first curved sections; and
    a second portion configured to install around the shaft and moveable relative to the first portion, the second portion comprising one or more second curved sections and at least one second portion flat, wherein the second portion flat is defined between a plurality of the second curved sections.

2. The retaining ring of claim 1, wherein the first portion and the second portion are not connected together such that the first portion and the second portion are free from each other.

3. The retaining ring of claim 1, wherein the first portion and the second portion are made of metal.

4. The retaining ring of claim 1, wherein an edge of the first portion flat and/or second portion flat is parallel with an edge of each curved section end.

5. A system, comprising:
    a shaft having at least one retaining ring slot defined on an outer radius thereof, the retaining ring slot at least including at least one first flat detent;
    a sleeve comprising a central orifice for receiving the shaft, the sleeve defining at least one inner radius ring interface defining at least one flat section; and
    a retaining ring retaining the shaft to the sleeve to fix the shaft rotationally and axially to the sleeve, comprising:
        a first portion configured to install around the shaft in at least one of the at least one retaining ring slot and within the sleeve in the inner radius ring interface, comprising first curved sections and at least one first portion flat defined between the first curved sections; and
        a second portion configured to install around the shaft in at least one of the at least one retaining ring slot and within the sleeve in the inner radius ring interface, the second portion moveable relative to the first portion, the second portion comprising second curved sections and at least one second portion flat defined between the curved sections.

6. The system of claim 5, wherein the first portion flat is disposed flushly in contact with the first detent, wherein the second portion flat is disposed flushly in contact with a second detent of the retaining ring slot.

7. The system of claim 6, wherein the retaining ring slot is symmetric about the shaft.

8. The system of claim 7, wherein the inner radius ring interface is symmetric about the central orifice.

9. The system of claim 7, further comprising the spring clip disposed with the clip slot to axially retain the retaining ring to the sleeve, thereby axially retaining the shaft to the sleeve.

10. The system of claim 7, wherein the shaft and the sleeve form at least a portion of a hydraulic system, wherein a shaft lubricant hole is aligned with a sleeve lubricant hole when the retained together by the retaining ring.

11. The system of claim 5, wherein the sleeve defines a clip slot axially forward of the inner radius ring interface and configured to receive a spring clip.

12. The system of claim 5, wherein the first portion and the second portion are identical halves of the retaining ring.

13. The system of claim 5, wherein the first portion and the second portion are not connected together such that the first portion and the second portion are free from each other.

14. The system of claim 5, wherein the first portion and the second portion are made of metal.

15. The system of claim 5, wherein an edge of the first portion flat and/or second portion flat is parallel with an edge of each curved section end.

16. A method for retaining a shaft to a sleeve, comprising:
    installing a first portion of a retaining ring in at least one retaining ring slot defined on an outer radius of a shaft, the retaining ring slot at least including at least one first portion flat detent, such that at least one first portion flat of the first portion is flush with the at least one first flat detent;
    installing a second portion of a retaining ring in at least one of the least one retaining ring slot defined on the outer radius of the shaft, the retaining ring slot at least including at least one second portion flat detent, such that at least one second portion flat of the second portion is flush with the at least one first flat detent;
    inserting the shaft having the first portion and second portion thereon into a central orifice of a sleeve such that the first portion and second portion interface with at least one inner radius ring interface defining at least one flat section such that the first portion and the second portion, and consequently the shaft, cannot rotate relative to the sleeve.

17. The method of claim 16, further comprising installing a spring clip into a clip slot that is axially forward of the inner radius ring interface and configured to receive the spring clip to axially retain the retaining ring to the sleeve, thereby axially retaining the shaft to the sleeve.

* * * * *